United States Patent Office 3,438,921
Patented Apr. 15, 1969

3,438,921
HOT-MELT BOOKBINDING ADHESIVES MODIFIED WITH A REACTION PRODUCT OF HEXAFLUOROACETONE
Mathias M. Coburn, Springfield, Pa., assignor to E. I. du Pont de Nemours and Company, Wilmington, Del., a corporation of Delaware
No Drawing. Filed June 8, 1966, Ser. No. 555,992
Int. Cl. C09j 3/14; C08f 29/38
U.S. Cl. 260—27                                7 Claims

ABSTRACT OF THE DISCLOSURE

A hot-melt thermoplastic adhesive especially adapted for binding books, magazines, catalogs and the like that consists essentially of a blend of: (A) 15–45% by weight of a copolymer of ethylene and vinyl acetate; (B) 35–55% by weight of a thermoplastic oleoresinous product; and (C) 10–50% by weight of a hexafluoroacetone reaction product.

---

This invention relates to bookbinding adhesives and more particularly to hot-melt adhesive compositions especially adapted for binding books, magazines, catalogs, and the like fabricated from coated paper stock.

Animal glues have been used in the bookbinding industry and only in recent years have the synthetic adhesives been adapted to bookbinding operations. In particular, thermoplastic hot-melt adhesive compositions are used which ordinarily are either free of volatile components or contain an effective small proportion of a volatile component for a particular function, e.g., control of the application characteristics in high speed binding operations. Typical synthetic hot-melt adhesive compositions adapted to bookbinding operations are described in U.S. Patents 2,612,463, 2,657,187 and 2,657,189. Commercial bookbinding operations and equipment therefor are described in detail in U.S. Patents 1,073,324, 1,248,252, 1,804,392, 1,867,803 and 2,646,726.

One of the problems involved in the use of the prior art hot-melt adhesives in a bookbinding operation is the inability to obtain uniform results with coated paper which is often less permeable to the hot-melt in comparison with results obtained with uncoated paper. Each of the aforementioned patents describing hot-melt bookbinding adhesives suggests application of an adhesive primer solution prior to application of the hot-melt; useful primers are generally low viscosity penetrating liquid solutions of the adhesive in a volatile liquid solvent. The need for using a solution primer in combination with the hot-melt adhesive partially nullifies the advantages of hot-melt synthetic adhesives over animal glue.

The novel hot-melt thermoplastic adhesive composition of this invention is a blend of: (A) 15–45% by weight of a copolymer of ethylene and vinyl acetate; (B) 35–55% by weight of a thermoplastic oleoresinous product which is compatible with the other constituents of the adhesive composition in the molten form; and (C) 10–50% by weight of at least one polymeric constituent of (1) a blend of the reaction product of hexafluoroacetone and a vinyl addition polymer having 2–18 carbon atoms per monomer unit and a hydrocarbon wax, or (2) a reaction product of hexafluoroacetone and hydrocarbon wax.

The novel adhesive composition is applied as a liquid hot-melt directly to the backbone of an assembly of paper book signatures or magazine signatures and can be used with conventional commercial equipment. While the adhesive is still heat activated, the cover is applied to the adhesive coated backbone of the book or magazine. By using the novel adhesive of this invention, the paper signature need not be pretreated with an adhesive primer to enhance receptivity of the signatures for the molten adhesive. An additional advantage is that the adhesive composition of this invention has excellent resistance to cold cracking and cold flow in comparison to conventional commercially available hot-melt bookbinding adhesives.

Copolymers of ethylene and vinyl acetate, designated hereinafter as E/VA copolymers are preferably used in an amount of 25–35% by weight of the adhesive composition of this invention to give the most desirable properties. E/VA copolymers are preferred that contain about 80% to 60% by weight of units of ethylene and about 20% to 40% by weight of units of vinyl acetate, and have a molecular weight in the range of about 100,000 to about 800,000, preferably 200,000 to 500,000. E/VA copolymers having a vinyl acetate content of approximately 25% to 35% are especially preferred in this invention since they provide the adhesive composition with good adhesion.

The second essential constituent of the adhesive composition of this invention is a thermoplastic oleoresinous product that is compatible with the E/VA copolymer and the other constituents of the adhesive composition and that has a melt temperature of about 50–300° F. Preferably, 40–50% by weight of the adhesive of the thermoplastic oleoresinous product is used to provide the most desirable balance of properties of adhesion and resistance to cold flow and cracking.

The following preferred thermoplastic oleoresinous products are used in this invention and are compatible with the E/VA copolymer and the hydrocarbon wax and form adhesive compositions with excellent physical properties: wood or gum rosin, hydrogenated rosin, esters of rosin and a polyhydric alcohol such as pentaerythritol and glycerol, esters of hydrogenated rosin and the ester of a terpene resin and one of the above polyhydric alcohols. Preferably, the thermoplastic oleoresinous product has a melt temperature of at least 140° F. If a resin is used that has a melt temperature below 150° F., preferably not more than about one-half the total thermoplastic oleoresinous resin component is of the low melt constituent.

By the above term "thermoplastic oleoresinous product" is meant a resin derived from one or more of several species of pine trees. Gum resin is prepared from a sticky mixture which is exuded from pine tree wounds when the tree is tapped. Distillation of this sticky mixture yields turpentine as the distillate and gum rosin that is useful in this invention as the residue. Wood rosin that is also useful in this invention is obtained by solvent extraction of pine stumps which have remained in the ground for a number of years after the trees have been cut down. Wood rosin is ordinarily refined by solvent treatment to remove colored and oxidized materials formed during weathering of the stump.

Turpentine is another source of a thermoplastic oleoresinous product useful in this invention. Turpentine yields a number of unsaturated cyclic hydrocarbons that have in most instances two double bonds per molecule and are designated as terpenes. Resins used in this invention which are practically neutral and have different melt temperatures, are obtained by polymerization of these terpenes. These polyterpene resins useful in this invention are commercially available resins in a number of grades which provide a wide selection of melt temperatures.

The chemical composition of rosins and terpenes and the preparation of derivatives therefrom useful in this invention are described in Paint and Varnish Technology by W. Von Fisher, Reinhold Publishing Corporation, New York, 1948, pages 108–118, 185–187.

The third necessary ingredient in the hot-melt adhesive composition of this invention is a polymeric constituent which preferably is present in an amount of 20–40% by weight of the adhesive and is (1) a blend of hydrocarbon wax and the reaction product of hexafluoroacetone, and a vinyl addition polymer having 2–18 carbon atom monomer units, (2) the reaction product of hexafluoroacetone and a hydrocarbon wax, or (3) a mixture of (1) and (2) above.

The hydrocarbon waxes useful in either of the above constituents (1), (2) or (3) are microcrystalline waxes of petroleum origin which are commercially available having melt temperatures ranging up to 230° F. These microcrystalline waxes can be used in combination with paraffin waxes having a melt temperature as low as 120° F. When paraffin wax is present, it is desirable that the proportion constitutes no more than about one-half of the total wax content. Preferably, the waxes or mixtures of the waxes have a melt temperature of at least 150° F.

The reaction product of hexafluoroacetone, hereinafter referred to as HFA, and a vinyl addition polymer is prepared by blending about 15–45% by weight of HFA with about 85–55% by weight of the vinyl addition polymer and heating this mixture at about 160–200° C. for about 15–25 hours. Preferably, about 25% by weight HFA is used with about 75% by weight of the vinyl addition polymer and the mixture is heated to about 180° C. for about 20 hours.

A wide variety of copolymerizable monomers can be used to form the aforementioned vinyl addition polymer useful in this invention. Monomers having from 2–18 carbon atoms per monomer unit and preferably from 2–12 carbon atoms per monomer unit are used. The following copolymerizable compounds are useful in the adhesive composition of this invention: alkyl esters of acrylic acid and methacrylic acid in which the alkyl group contains from 1–12 carbon atoms; conjugated dienes having 4–10 carbon atoms, such as butadiene; olefins, such as ethylene; acrylonitrile; styrene, substituted styrenes, such as α-methyl styrene; vinyl acetate; vinyl chloride; dibutyl maleate and the like or blends of these compounds. Preferred vinyl addition polymers are: ethylene/vinyl acetate and butadiene/α-methyl styrene.

The blend of the hydrocarbon wax and the reaction product of the vinyl addition polymer and HFA is preferably about 15–60% by weight reaction product and 85–40% by weight hydrocarbon wax and more preferably 40–30% reaction product and 60—70% hydrocarbon wax.

The reaction product of HFA and the hydrocarbon wax which can also be used as the third constituent of the hot-melt adhesive composition of this invention is prepared similarly to the above vinyl addition polymer/HFA reaction product by blending 10–30% by weight of HFA with 90–70% by weight hydrocarbon wax and heating this mixture to about 160–200° C. for about 15–25 hours. The preferred composition is the reaction product of 15–25% by weight HFA and 75–85% by weight hydrocarbon wax.

Table I summarizes the essential ingredients used in the hot-melt adhesive composition of this invention (proportions given in weight percent):

TABLE I

| | Useful proportions | Preferred proportions |
|---|---|---|
| (A) E/VA copolymer | 15–45 | 25–35 |
| (B) Thermoplastic oleoresinous product | 35–55 | 40–50 |
| (C) Polymeric constituent | 10–50 | 20–40 |
| (1) Reaction product of a vinyl addition polymer and HFA/hydrocarbon wax | 15–60/85–40 | 40–30/60–70 |
| or | | |
| (2) Reaction product of hydrocarbon wax/HFA | 90–70/10–30 | 75–85/25–15 |

The following are particularly preferred hot-melt adhesive compositions of this invention because of their excellent stability and adhesive properties.

Hot-melt adhesive 1: Percent weight
E/VA copolymer having a ratio of ethylene to vinyl acetate of 75:25 _____ 18–22
Thermoplastic oleoresinous product of hydrogenated gum rosin and ester gum having a melt temperature in the range of 150–250° F. _____ 40–50
Reaction product of E/VA copolymer and HFA reacted in a weight ratio of 75:25 __ 10–14
Hydrocarbon wax having a melt temperature of 200–230° F. _____ 0.1–1
Antioxidant _____ 0.1–1

Hot-melt adhesive 2.—Same as 1 above except the following reaction product is substituted for the E/VA copolymer/HFA reaction product: 76 parts by weight of butadiene/24 parts by weight α-methyl styrene copolymer which is reacted with HFA in a ratio of about 70:30.

Hot-melt adhesive 3: Percent by weight
E/VA copolymer _____ 30–34
Thermoplastic oleoresinous product of hydrogenated rosin and ester gum, melt temperature 150–250° F. _____ 40–50
Reaction product of a hydrocarbon wax having a melt temperature of about 210–220° F. and HFA reacted in a weight ratio 80:20 _____ 20–25
Antioxidant _____ 0.1–1

It is ordinarily desirable to include a stabilizer to increase the pot-life of the hot-melt adhesive composition of this invention. Typical useful stabilizers or antioxidants for the adhesive composition are the 2,4,6-trialkylated monohydroxy phenols, e.g., 2,4,6-tri-tertiarybutyl phenol and 2,6-ditertiarybutyl-4-methyl phenol; 4,4'-thiobis(6-tertiary butyl m-cresol); butylated hydroxy anisole and butylated hydroxy toluene. The amount of stabilizer ordinarily is in the range of from about 0.01% by weight to about 1% by weight of the adhesive composition, preferably 0.1 to 0.5% by weight.

Other ingredients which provide additional desirable properties can also be added to the adhesive composition of this invention; for example, chlorinated diphenyls having about 40 to 60 percent by weight of combined chlorine are typical of liquifying softeners which can be added.

The following examples illustrate the invention. All parts and percentages are by weight unless otherwise indicated.

EXAMPLE 1

The following ingredients are blended together to form a hot-melt adhesive composition:

Parts by weight
Copolymer of ethylene and vinyl acetate containing about 80–60 parts by weight ethylene and 20–40 parts by weight vinyl acetate _____ 20.0
Reaction product of E/VA copolymer and hexafluoroacetone _____ 12.0
"Stabelite"—hydrogenated rosin _____ 35.0
Ester gum _____ 9.5
Hot-melt paraffin wax (M.P. 214° F.) _____ 23.0
Antioxidant—2,4,6-tritertiarybutyl phenol _____ 0.5

Total _____ 100.0

The reaction product of the E/VA copolymer and HFA is formed by mixing about 75.4 parts of an ethylene/vinyl acetate copolymer containing about 70% by weight ethylene units and 30% by weight vinyl acetate units with about 24.6 parts by HFA. This mixture is then heated to about 180° C. and held at this temperature for about 20 hours.

The ester gum has a melt temperature of about 190° F. and dries to a white clear film.

The paraffin wax, ester gum and the hydrogenated rosin are initially liquified by heating to a temperature of about 300° F. and mixed together while maintaining this temperature. The ethylene/vinyl acetate copolymer and the reaction product are then slowly added with continuous mixing and then the antioxidant is added. The resulting composition is mixed for about two hours while maintaining the temperature at about 300° F. and then the composition is allowed to cool and solidify. The resulting hot-melt adhesive composition is a compatible mixture in both the molten state and in the solid state after it is cooled.

The tensile strength and elongation of the above prepared adhesive composition is measured by casting a standard dumbell bar 4½ inches long, ¼-inch thick and two end portions of about 1 x 1 inch which are joined by a section ½ x 2½ inches. The bars are evaluated on an Instron tensile tester at about 77° F. and 50% relative humidity. The tensile strength of the above adhesive sample at 100% elongation is about 56 pounds and the elongation at the break point of the sample is about 625%.

The adhesive composition is evaluated in a small scale binder operation which simulates the conditions of a commercial operation. Dummy copies of Reader's Digest are fabricated from signatures of coated paper ordinarily used in this magazine. A coating of about 15–25 mils of the above prepared adhesive in the molten form (about 320° F.) is uniformly applied to the above paper backbone of the magazine without having the backbone previously primed or preheated. The cover of the magazine is then immediately positioned over the backbone of the magazine and pressed into adherence with the adhesive as occurs in a commercial binding operation. Upon cooling, the resulting magazine is satisfactorily bound, exhibits good page pull and excellent page flex. Page pull is a measure of the force necessary to separate the page from the adhesive binding and page flex is a measure of the amount of flexing a page will undergo before separating from the adhesive coated backbone of the magazine.

EXAMPLE 2

A hot-melt adhesive composition is prepared using the identical constituents and procedure as in Example 1, except the following reaction product is substituted for the E/VA copolymer/HFA reaction product: about 72 parts by weight of a butadiene/α-methyl styrene copolymer containing about 76% by weight butadiene units and 24% by weight α-methyl styrene units are reacted with about 28 parts by weight of HFA at about 180° C. for about 20 hours.

The resulting hot-melt adhesive composition has physical properties similar to the composition of Example 1. The adhesive composition is applied as in Example 1 to the backbone of a dummy Reader's Digest magazine without the use of a primer or without preheating the backbone of the magazine and the magazine cover is pressed into adherence with the adhesive. The resulting magazine is satisfactorily bound and the magazine has a page flex of about 1570, i.e., the pages of the magazine withstood an average of about 1570 flexes before tearing from the backbone of the magazine; each flex applied under about one-pound tension to separate the page from the adhesive matrix.

EXAMPLE 3

The following ingredients are blended together to form a hot-melt adhesive composition:

| | Parts by weight |
|---|---|
| Ethylene/vinyl acetate copolymer (described in Example 1) | 32 |
| "Stabelite"—hydrogenated rosin | 35 |
| Ester gum having a melt temperature of 190/ F. | 9.5 |
| Reaction product of Paraflint RG Wax and HFA | 23 |
| Antioxidant—2,6-di-tertiary butyl-4-methyl phenol | 0.5 |
| Total | 100.0 |

Paraflint RG Wax is a paraffin wax having a melt temperature of about 215° F. The reaction product of the Paraflint Wax and HFA is formed by mixing about 80% by weight of the above wax with about 20% by weight of HFA and reacting this mixture at about 180° C. for about 20 hours.

The wax/HFA reaction product, the ester gum and the hydrogenated rosin are liquified by heating to about 300° F. and the ethylene/vinyl acetate copolymer is then blended into mixture with the antioxidant. This composition is held at about 300° F. for about 2 hours with continuous mixing. The resulting hot-melt adhesive is a compatible mixture in the molten state and in the solid state after cooling.

Dummy copies of a Reader's Digest magazine are made with the above prepared adhesive using the procedure of Example 1. The hot-melt adhesive is applied without using a primer or without heating the backbone before application of the adhesive. The resulting magazines are satisfactorily bound and the magazines exhibited excellent page pull and page flex upon testing.

I claim:

1. A hot-melt adhesive composition consisting essentially of a blend of:

(A) 15–45% by weight of a copolymer of ethylene and vinyl acetate consisting essentially of 80–60% by weight of units of ethylene and 20–40% by weight of units of vinyl acetate and having a molecular weight of about 100,000–800,000;

(B) 35–55% by weight of thermoplastic oleo-resinous product having a melt temperature of 50–300° F., selected from the group consisting of wood rosin, gum rosin, hydrogenated rosin, wood rosin esters, gum rosin esters, hydrogenated rosin esters, terpene resin and terpene resin esters;

(C) 10–50% by weight of at least one polymer constituent selected from the group consisting of
  (1) a blend of 15–60% by weight of the reaction product of 15–45% by weight hexafluoroacetone and 85–55% by weight of a vinyl addition polymer having 2–18 carbon atoms per monomer unit, and 85–40% by weight of a hydrocarbon wax having a melt temperature of about 120–230° F.; or
  (2) a reaction product of 10–30% by weight hexafluoroacetone and 90–70% by weight of a hydrocarbon wax having a melt temperature of about 120–230° F.

2. The adhesive composition of claim 1 in which the vinyl addition polymer is an ethylene/vinyl acetate copolymer of 80–60% by weight of units of ethylene and 20–40% by weight of units of vinyl acetate.

3. The adhesive composition of claim 1 in which the vinyl addition polymer is a butadiene/α-methyl styrene copolymer consisting essentially of 65–75% by weight of units of butadiene and 35–25% by weight of units of α-methyl styrene.

4. The adhesive composition of claim 1 in which the (C) constituent is the reaction product of 20–40% by weight of hexafluoroacetone and 80–60% by weight of a hydrocarbon wax having a melt temperature of about 200–220° F.

5. The adhesive composition of claim 1 in which the blend is
   (A) 25–35% by weight of said ethylene/vinyl acetate copolymer,
   (B) 40–50% by weight of said thermoplastic oleoresinous product, and
   (C) 20–40% by weight of a polymer blend of
       (1) 40–30% by weight of the reaction product of 25–35% by weight of hexafluoroacetone and 75–65% by weight of an ethylene/vinyl acetate copolymer consisting essentially of 25–35% by weight of vinyl acetate units and about 75–65% by weight ethylene units,
       (2) 60–70% by weight of a hydrocarbon wax having a melt temperature of about 200–230° F.; and
   (D) about 0.01–1% by weight of an antioxidant selected fom the group consisting of 2,4,6-trialkylated monohydroxy phenols, 4,4'-thio-bis-(6-tertiary butyl m-cresol), butylated hydroxy anisole and butylated hydroxy toluene.

6. The adhesive composition of claim 1 in which the blend is
   (A) 25–35% by weight of said ethylene/vinyl acetate copolymer,
   (B) 40–50% by weight of said thermoplastic oleoresinous product, and
   (C) 20–40% by weight of a polymer blend of
       (1) 30–40% by weight of the reaction product of 25–35% by weight hexafluoroacetone and 75–65% by weight of butadiene/α-methyl styrene copolymer consisting essentially of about 70–80% by weight butadiene units and 30–20% by weight of α-methyl styrene units,
       (2) 60–70% by weight of a hydrocarbon wax having a melt temperature of about 200–230° F.; and
   (D) about 0.01–1% by weight of an antioxidant selected from the group consisting of 2,4,6-trialkylated monohydroxy phenols, 4,4'-thio-bis-(6-tertiary butyl m-cresol), butylated hydroxy anisole and butylated hydroxy toluene.

7. The adhesive composition of claim 1 in which the blend is
   (A) 25–35% by weight of said ethylene/vinyl acetate copolymer,
   (B) 30–40% by weight of said thermoplastic oleoresinous products,
   (C) 20–30% by weight of a polymer blend of the reaction product of 10–30% by weight of hexafluoroacetone and 90–70% by weight of a hydrocarbon wax having a melt temperature of about 200–230° F., and
   (D) about 0.01–01% by weight of an antioxidant selected from the group consisting of 2,4,6-trialkylated monohydroxy phenols, 4,4'-thio-bis-(6-tertiary butyl m-cresol), butylated hydroxy anisole and butylated hydroxy toluene.

References Cited

UNITED STATES PATENTS

| | | | |
|---|---|---|---|
| 2,490,550 | 12/1949 | Sermattei | 260—27 |
| 3,342,777 | 9/1967 | Howard | 260—63 |

DONALD E. CZAJA, *Primary Examiner.*

W. E. PARKER, *Assistant Examiner.*

U.S. Cl. X.R.

260—28.5, 45.95